US009340928B2

(12) United States Patent
Bartelmuss

(10) Patent No.: US 9,340,928 B2
(45) Date of Patent: May 17, 2016

(54) TEARING TAPE FOR SEVERING A PAPER WEB IN A PAPERMAKING INSTALLATION

(71) Applicant: Klaus Bartelmuss, Teufenbach (AT)

(72) Inventor: Klaus Bartelmuss, Teufenbach (AT)

( * ) Notice: Subject to any disclaimer, the term of this patent is extended or adjusted under 35 U.S.C. 154(b) by 26 days.

(21) Appl. No.: 14/459,618

(22) Filed: Aug. 14, 2014

(65) Prior Publication Data

US 2015/0118446 A1 Apr. 30, 2015

(30) Foreign Application Priority Data

Oct. 31, 2013 (AT) ................................. A 838/2013

(51) Int. Cl.

| | |
|---|---|
| ***B32B 3/14*** | (2006.01) |
| ***D21H 27/30*** | (2006.01) |
| ***D21F 7/00*** | (2006.01) |
| ***B26D 1/547*** | (2006.01) |
| ***B65H 19/26*** | (2006.01) |
| ***B26F 3/02*** | (2006.01) |

(52) U.S. Cl.

CPC .............. *D21H 27/30* (2013.01); *B26D 1/5475* (2013.01); *B26F 3/02* (2013.01); *B65H 19/262* (2013.01); *D21F 7/006* (2013.01); *B65H 2801/84* (2013.01); *Y10T 428/24479* (2015.01); *Y10T 428/24612* (2015.01)

(58) Field of Classification Search

CPC ............... Y10T 428/24612; Y10T 428/24488; Y10T 225/298; B65H 19/26; B65H 19/267

See application file for complete search history.

(56) References Cited

U.S. PATENT DOCUMENTS

| | | | | |
|---|---|---|---|---|
| 4,659,029 | A | 4/1987 | Rodriguez | |
| 4,711,404 | A | 12/1987 | Falk | |
| 5,725,177 | A | 3/1998 | Bartelmuss et al. | |
| 5,816,526 | A | 10/1998 | Bartelmuss et al. | |
| 7,794,816 | B2 * | 9/2010 | Rodriguez ........... | B31D 1/0056 242/526.2 |
| 2005/0008817 | A1 * | 1/2005 | Rodriguez ........... | B31D 1/0056 428/98 |

FOREIGN PATENT DOCUMENTS

| | | | |
|---|---|---|---|
| AT | 402912 | B | 9/1997 |
| EP | 0708049 | A1 | 4/1996 |
| WO | 8600282 | A1 | 1/1986 |

* cited by examiner

*Primary Examiner* — Alexander Thomas

(74) *Attorney, Agent, or Firm* — Laurence A. Greenberg; Werner A. Stemer; Ralph E. Locher

(57) ABSTRACT

A tearing tape which is composed of paper for severing a paper web which moves from a system for producing paper and is wound up on drums, in order as a result to make it possible for it to be wound onto an empty drum. Here, the tearing tape, in cross-section, has a central tape part and two lateral tape parts. The central tape part has a thickness that is at least 1.5 times greater than a thickness of the lateral tape parts.

11 Claims, 6 Drawing Sheets

TEARING TAPE FOR SEVERING A PAPER WEB IN A PAPERMAKING INSTALLATION

CROSS-REFERENCE TO RELATED APPLICATION

This application claims the priority, under 35 U.S.C. §119, of Austrian patent application A 838/2013, filed Oct. 31, 2013; the prior application is herewith incorporated by reference in its entirety.

BACKGROUND OF THE INVENTION

Field of the Invention

The present invention relates to a tearing tape which is composed of paper for severing a paper web which moves from a system for producing paper and is wound up on drums, in order as a result to make it possible for it to be wound onto an empty drum.

When winding a paper web which is produced in a system for manufacturing paper onto drums, there is the requirement, as soon as a drum has reached a predefined wound diameter, to sever a paper web, in order for it to be possible to continue the winding of the paper web onto an empty drum. For this purpose, a tearing tape is used which is wound helically on the empty drum, the paper web being severed along a helical line and at the same time that paper web being wound on the empty drum. In order for it to be possible for the tearing tape to be fed to recycling together with those parts of the paper web which are damaged as a result of the severing operation. The tearing tape is produced from paper.

Apparatuses of this type for severing a paper web are known, for example, from U.S. Pat. No. 4,711,404, from U.S. Pat. No. 4,659,029 (corresponding to International Patent Publication WO 86/00282) and from U.S. Pat. No. 5,725,177 (corresponding to European Patent EP 708 049 B1). In those apparatuses, a tearing tape or tear strip is moved from one side of the paper web through a guide channel to its other side. The guide channel is configured with an opening on its side which faces the paper web. As soon as the paper web is to be severed, the free end of the tearing tape is fastened to the rotating, empty drum, as a result of which the tearing tape is pulled out of the guide channel through the opening which faces the paper web. The paper web is severed along a helical line and is wound onto the empty drum.

In known guide channels of this type, in which the tearing tape is moved from one side of the paper web to the other side of the paper web, it has to be ensured that the tearing tape remains in the guide channel during the movement to the other side of the paper web and does not pass out of the guide channel through the opening which faces the paper web. In the apparatus according to the above-mentioned U.S. Pat. No. 4,659,029 and WO 86/00282, this is brought about by virtue of the fact that the guide channel for the tearing tape is configured at the opening which faces the paper web with two bars which are directed toward one another, as a result of which the width of the opening is smaller than the width of the tearing tape.

In the known apparatus, the tearing tape consists of a plurality of paper strings which are connected next to one another and to one another. According to U.S. Pat. No. 5,816,526 (Austrian Patent AT 402912 B), the tearing tape consists of a paper strip which has been folded multiple times.

Since the previously known tearing tapes have an at least approximately homogeneous thickness and strength over the entire width, there is the risk, as soon as the tearing tape is pulled out of the guide channel in order to sever the paper web, that the tearing tape is damaged in its lateral regions. In particular, there is the risk that lateral regions of the tearing tape may be torn off, as a result of which the tearing tape is critically weakened and the tearing tape tears during the movement out of the guide channel or as a consequence thereof. As a result, the operation of winding the paper web onto an empty drum has to be interrupted. In addition, remains of the tearing tape can remain in the guide channel, as a result of which there is the risk of clogging of the guide channel.

SUMMARY OF THE INVENTION

It is accordingly an object of the invention to provide a tearing tape which overcomes the disadvantages of the heretofore-known devices of this general type and which provides for a tearing tape, in which it is ensured that it is not damaged while being pulled out of the guide channel through that opening of the guide channel which faces the paper web, in order to bring about the severing of the paper tape.

With the above and other objects in view there is provided, in accordance with the invention, a tearing tape in a papermaking installation, for severing a paper web being wound up on a drum for winding the paper web onto an empty drum, the tearing tape comprising:

a tape composed of paper and having a central tape part and two lateral tape parts in cross section;

the central tape part having at least 1.5 times a thickness of the lateral tape parts.

In other words, the objects of the invention are achieved by virtue of the fact that the tearing tape, or tear strip, has a central tape part and two lateral tape parts in cross section, the central tape part having at least 1.5 times the thickness of the lateral tape parts.

The central tape part is preferably configured by way of a plurality of paper strings which lie next to one another or by way of a plurality of paper layers. In particular, the tearing tape can be formed by an at least single-ply paper tape which is provided in its central region with an overlay comprising paper strings or at least one paper layer.

In an alternative implementation, the tearing tape is preferably formed by an at least two-ply paper tape which is provided in its central region with an insert comprising paper strings or at least one paper layer.

According to a further preferred embodiment, the thickness of the overlays or inserts which are situated in the central tape part and comprise paper strings or at least one paper layer decreases from the central region toward the lateral regions. Furthermore, the paper strings or the at least one paper layer can be adhesively bonded to the at least single-ply paper tape.

The central tape part is preferably configured by way of a substantially thicker paper tape which lies on an at least single-ply paper tape or is enveloped by an at least two-ply paper tape.

The central tape part preferably has a width which is equal to at least ⅙ of the width of the tearing tape. However, the central tape part can also have a width which is equal to at least ⅕, ¼ or ⅓ of the width of the tearing tape. In a preferred embodiment, the central tape part has a width which is approximately equal to half the width of the tearing tape.

Other features which are considered as characteristic for the invention are set forth in the appended claims.

Although the invention is illustrated and described herein as embodied in a tearing tape for severing the paper web in a system for producing paper, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

A system for winding up a paper web, which system is situated at the end of a paper production system, has a first drum, onto which the paper web which arrives from the paper production system is wound. In addition, a further empty drum is provided, onto which the paper web is wound as soon as the first drum has reached the desired wound diameter. In order for it to be possible to transfer from the first drum to the empty drum during the operation of winding up, the paper web has to be severed.

The above-mentioned earlier patents contain additional information regarding such papermaking systems. If necessary, reference may be had for additional details to the above-mentioned U.S. Pat. Nos. 4,711,404; 4,659,029; 5,725,177; and 5,816,526; those disclosures are incorporated by reference herein.

Tearing tapes serve for the purpose of severing the paper web so that it may be spliced onto a yet-empty roll. The free end of the tearing tape is conveyed from one side of the paper web through a guide channel which is situated in a guide rail to the other side of the paper web. As soon as the paper web is to be severed, the front end of the tearing tape is fastened to the rotating empty drum by means of an adhesive coating which is situated on it, as a result of which it is pulled out of the guide channel through an opening which faces the paper web and is wound helically on the empty drum. As a result, the paper web is severed helically and the front torn edge of the paper web is brought into contact with the empty drum, as a result of which the paper web is wound onto the empty drum. After this, the full drum is removed and the further drum, onto which the paper web is being wound, is arranged in its place.

By way of a system of this type, the paper web which is fed from the paper production system at a speed of, for example, 25 m/s can accordingly be wound continuously on drums. As soon as a drum has reached the provided wound diameter, the paper web is severed, the transition of the winding operation to an empty further drum takes place, and the full drum is transported away.

Figure 1:
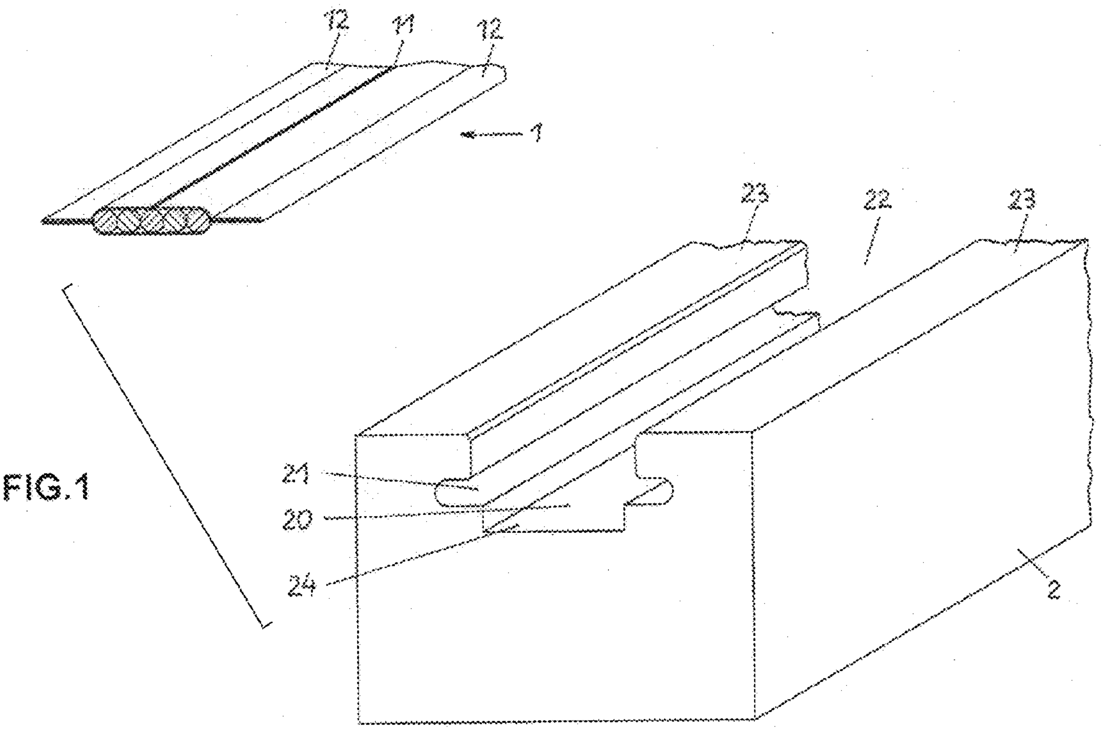
FIG. 1 is a perspective and partly sectional view showing a guide rail which is situated in an apparatus for winding up a paper web and for changing the drums, with a guide channel, and a tearing tape according to the invention to be pushed into the guide channel.

Referring now to the figures of the drawing in detail and first, particularly, to FIG. 1 thereof, there is shown a tearing tape 1 and a guide rail 2 with a guide channel 20. The guide rail 2 is situated in a system for changing the drums, onto which a paper web is wound. The tearing tape 1 is displaced through the guide channel 20 from one side of a paper web to the other side.

Figure 1A:
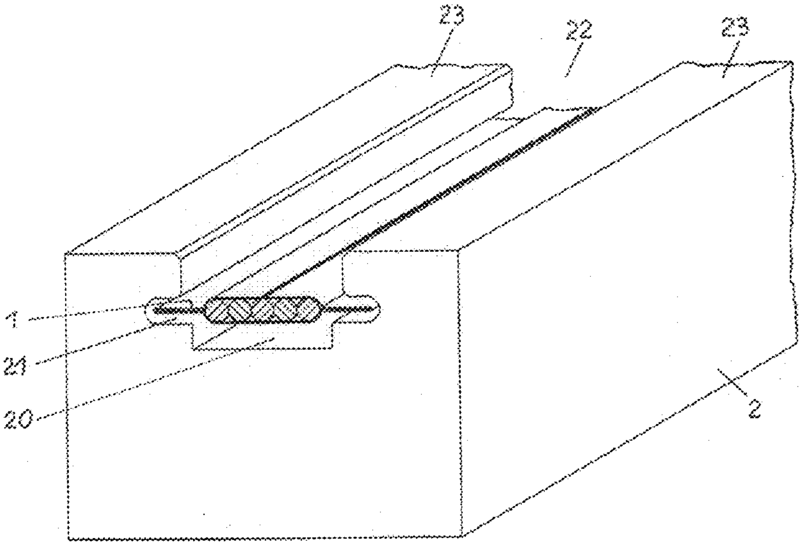
FIG. 1A is a similar view of the guide rail with tearing tape in place.

FIG. 1A shows the tearing tape in its position, in which it is pushed into the guide channel 20.

The tearing tape 1 has a central tape part 11 which is relatively stiff and two lateral tape parts 12, referred to as wings, which are relatively elastic. The guide channel 20 has a central region 21, the inside width of which is approximately equal to the width of the tearing tape 1. On its side which faces the paper web, the guide rail 2 is configured with an opening 22 which is situated between two bars 23 which are directed toward one another, as a result of which the width of the opening 22 which faces the paper web is smaller than the width of the tearing tape 1. Below the central region 21 of the guide channel 20, furthermore, the guide rail 2 is configured with a groove 24 which serves to receive an adhesive element which is situated at the front end of the tearing tape 1 and by way of which the free end of the tearing tape 1 is fastened to the rotating empty drum for the severing operation of the paper web.

Since the two lateral tape parts 12 of the tearing tape 1 are substantially more elastic than the central tape part 11 of the tearing tape 1, the tearing tape 1 can be pulled through the opening 22 out of the guide channel 20 in order to sever the paper web, without said tearing tape 1 being damaged as a result.

Figure 2:
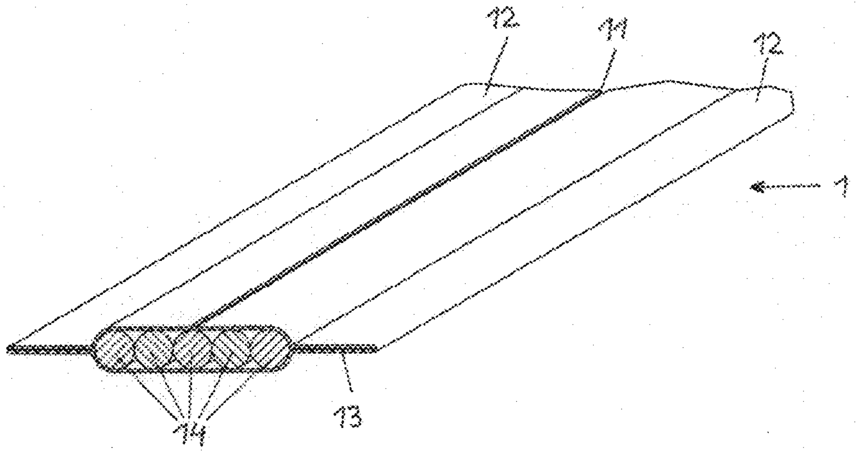
FIG. 2, FIG. 2A, and FIG. 2B illustrate three further embodiments of a tearing tape according to the invention, in an axonometric and partly sectional illustration.

In the following text, a plurality of embodiments of the tearing tape 1 according to the invention are explained:

The tearing tape 1 which is shown in FIG. 2 consists of a paper tape 13 which is folded once and is therefore two-ply, in the central region 11 of which five paper strings 14 are situated which are enveloped by the two plies of the paper tape 13 and the diameter of which is approximately five times as great as the thickness of the two-ply paper tape 13. The width of the central tape part 11 is somewhat greater than twice the width of each of the two lateral tape parts 12.

Figure 2A:
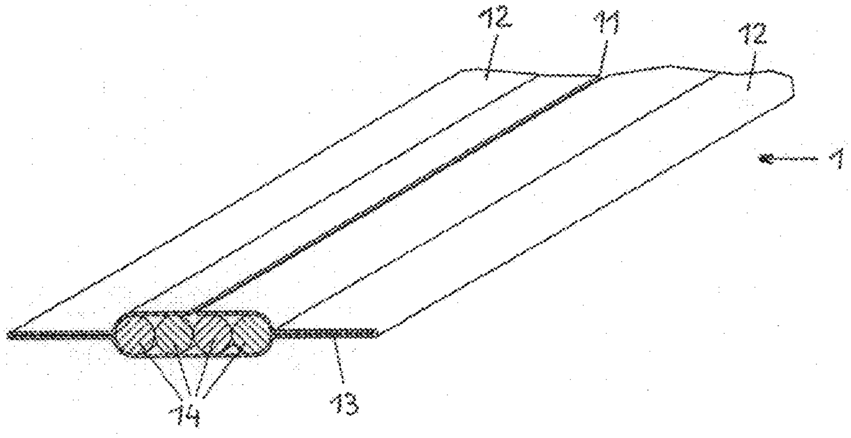
Figure 2B:
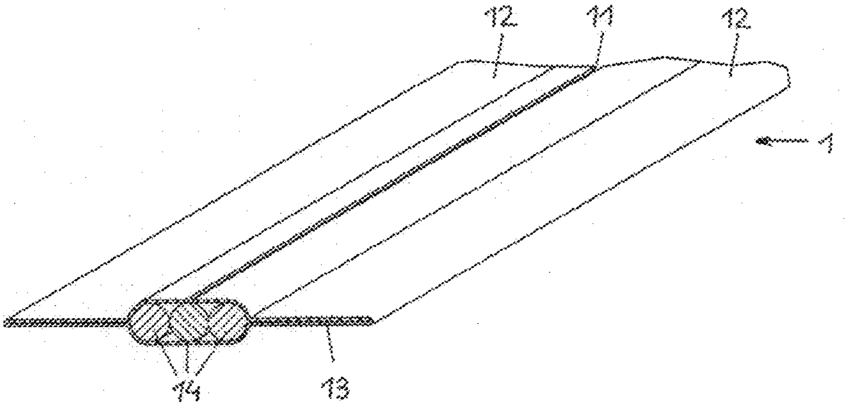

The tearing tapes 1 according to FIG. 2A and FIG. 2B differ from the tearing tape 1 according to FIG. 2 in that only four and three paper strings 14, respectively, are situated in their central tape part 11, as a result of which the central tape parts 11 have correspondingly smaller widths.

In all of said tearing tapes 1, the central tape parts 11 have the required high tear resistance, whereas the two lateral tape parts 12 in each case exhibit a high elasticity.

Figure 3:
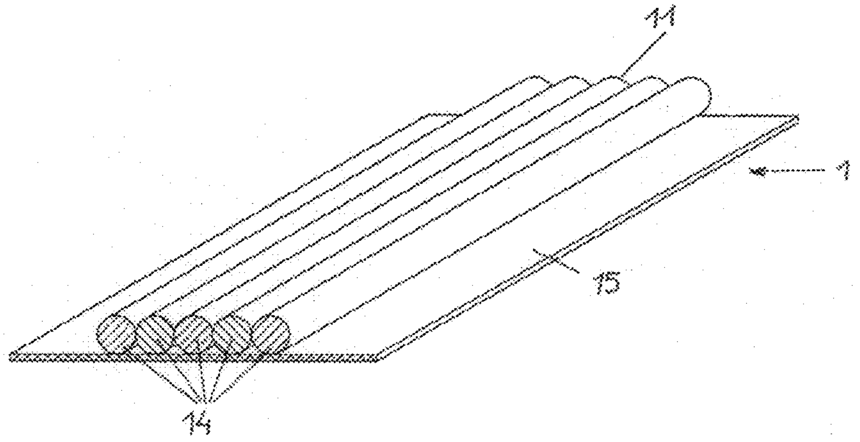
FIG. 3, FIG. 3A, and FIG. 3B illustrate three further embodiments of a tearing tape according to the invention, in an axonometric and partly sectional illustration.

The tearing tape 1 which is shown in FIG. 3 consists of a single-ply paper tape 15, on the central tape part 11 of which five paper strings 14 which are arranged next to one another are situated.

Figure 3A:
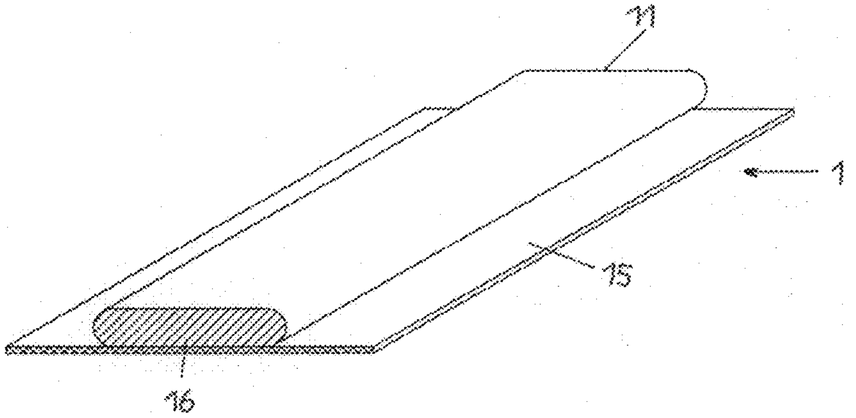

The tearing tape 1 which is shown in FIG. 3A consists of a single-ply paper tape 15, in the central tape part 11 of which a substantially thicker paper tape 16 is situated, the width of which is approximately equal to the width of five paper strings 14.

Figure 3B:
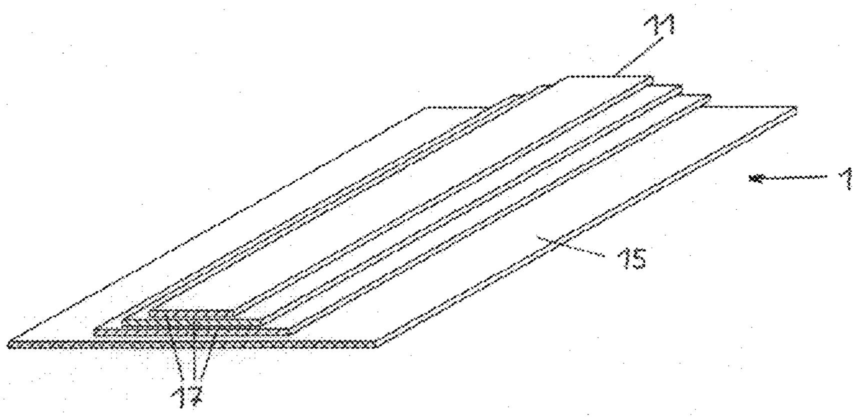

The tearing tape 1 which is shown in FIG. 3B consists of a single-ply paper tape 15 which is configured in its central tape part 11 by way of three paper tapes 17 which are layered one above another and the widths of which decrease in the direction away from the paper tape 15.

Figure 4:
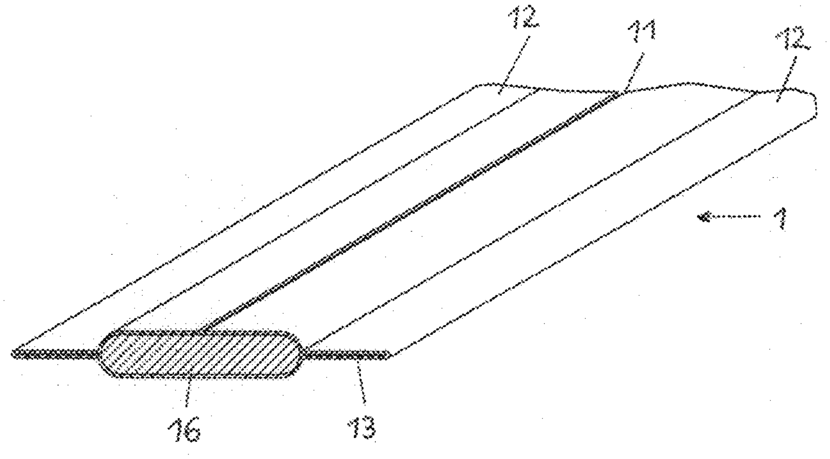
FIG. 4, FIG. 4A, and FIG. 4B illustrate three further embodiments of a tearing tape according to the invention, in an axonometric and partly sectional illustration.

The tearing tape 1 which is shown in FIG. 4 consists of a two-ply, folded paper tape 13, in the central tape part 11 of which a substantially thicker paper tape 16 is situated which is enclosed by the folded paper tape 13.

Figure 4A:
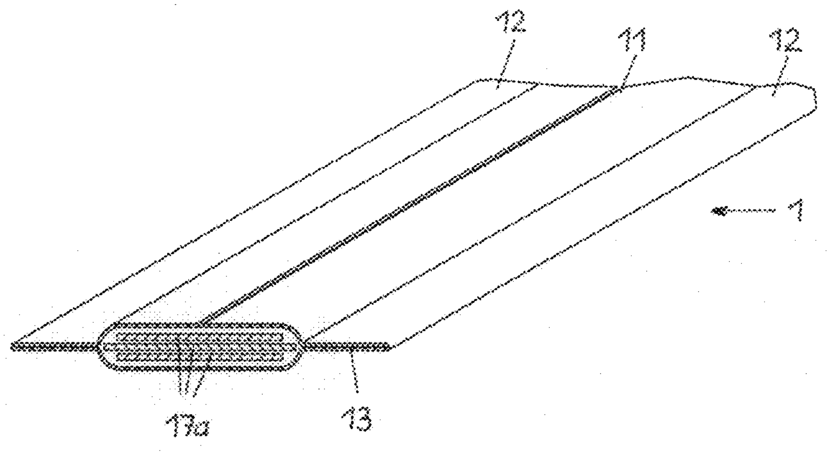

The tearing tape 1 which is shown in FIG. 4A consists of a two-layer, folded paper tape 13, in the central tape part 11 of which three paper tapes 17*a* are situated which are layered one on another and are enclosed by the paper tape 13, the central paper tape having a somewhat greater width than the two other paper tapes.

Figure 4B:
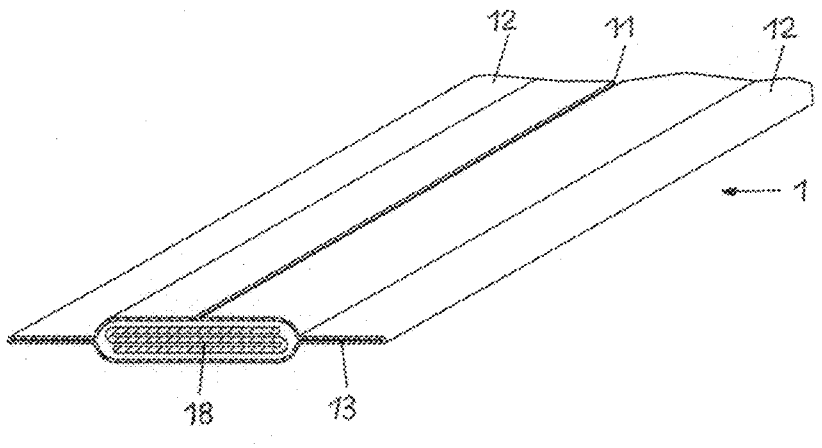

The tearing tape 1 which is shown in FIG. 4B consists of a two-layer, folded paper tape 13, in the central tape part 11 of which a paper tape 18 is situated which is folded twice and is therefore three-ply and is enclosed by the paper tape 13.

Figure 5:
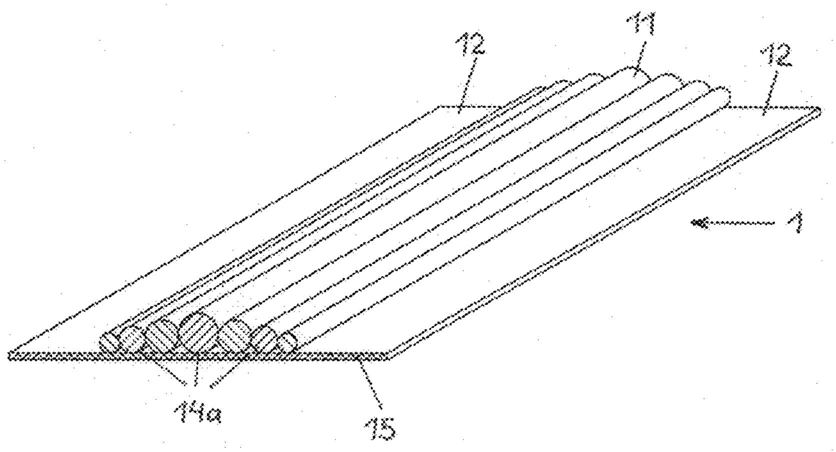
FIG. 5, FIG. 5A, and FIG. 5B illustrate three further embodiments of a tearing tape according to the invention, in an axonometric and partly sectional illustration.

The tearing tape 1 which is shown in FIG. 5 consists of a single-ply paper tape 15, in the central tape part 11 of which seven paper strings 14*a* are situated which have diameters which decrease from the center toward the outside.

Figure 5A:
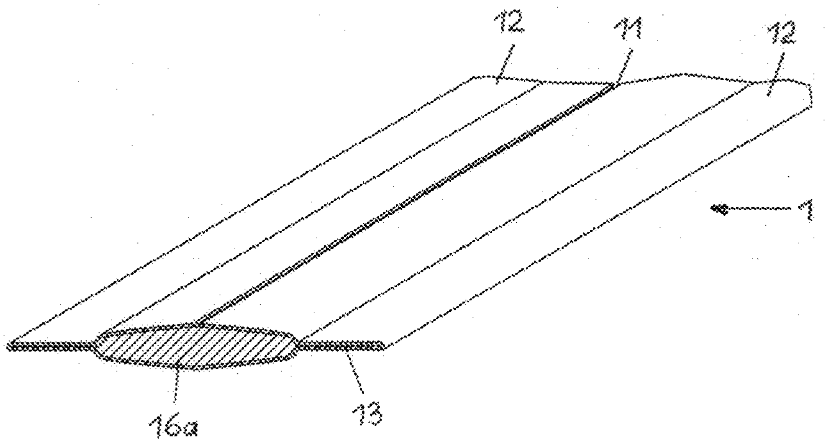

The tearing tape 1 which is shown in FIG. 5A consists of a two-layer paper tape 13, in the central tape part 11 of which a substantially thicker paper tape 16*a* is situated, the thickness of which decreases from the center toward the outside, and which paper tape 16*a* is enclosed by the paper tape 13.

Figure 5B:
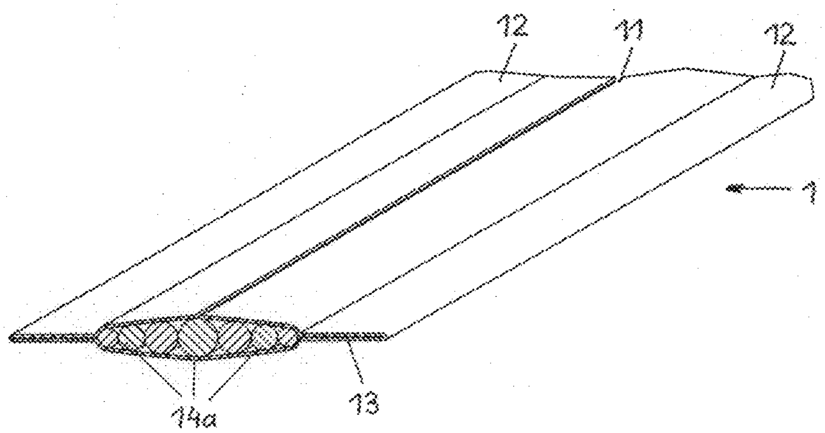

The tearing tape 1 which is shown in FIG. 5B consists of a two-layer, folded paper tape 13 which is configured in its central tape part 11 by way of seven paper strings 14*a* which have diameters which decrease from the center toward the outside, and which paper strings 14*a* are enclosed by the paper tape 13.

In all the tearing tapes 1 which are shown, the individual constituent parts are adhesively bonded at least partially on the surfaces which adjoin one another, i.e., which lie on one another.

All of said tearing tapes 1 have a central tape part 11 and two lateral tape parts 12 in cross section, the central tape part 11 having at least 1.5 times the thickness, preferably 2 times the thickness and, according to the exemplary embodiments, 5 times the thickness of the lateral tape parts 12. In addition, the central tape part 11 has approximately half the width of the entire tearing tape.

The tearing tape 1 can also be configured with a central tape part 11 which has ⅙, ⅕, ¼ and ⅓ of the width of the entire tearing tape 1.

On account of the reinforced central tape parts 11, the tearing tapes 1 have that tear resistance which is required for severing the paper web. Since the lateral tape parts 12 have a substantially smaller thickness in contrast, they fulfill the function that the tearing tape 1 does not pass out of the guide channel 20 through the opening 22 during its movement in said guide channel 20 toward the other side of the paper web. However, the lateral tape parts 12 are so elastic that the tearing tape 1, as soon as it is pulled out of the guide channel 20 through its opening 22 which faces the paper web, is not damaged and, in particular, is not severed.

Figure 6:
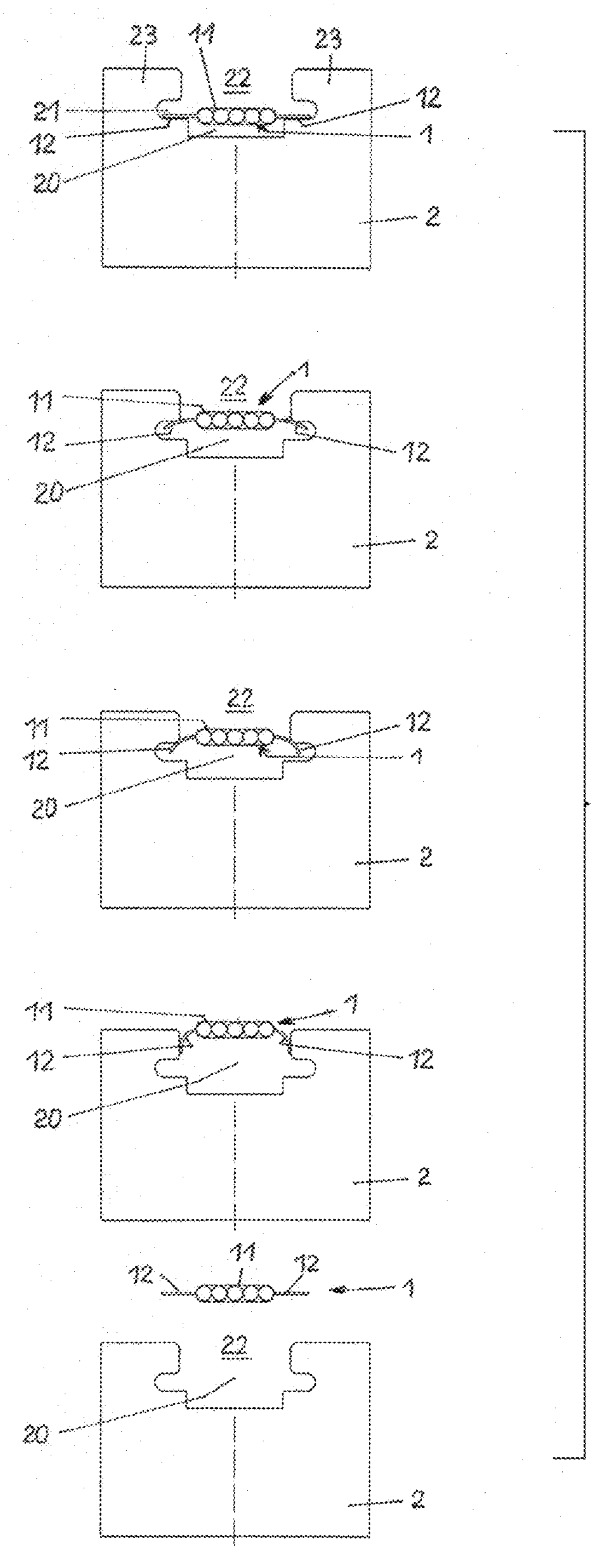
FIG. 6 are five front elevation views of the guide rail illustrating a sequence of the movement of a tearing tape according to the invention during its movement out of the guide channel.

FIG. 6 shows the individual phases of the movement of the tearing tape 1 out of the guide channel 20 which is situated in the guide rail 2, from which it can be seen that the tearing tape 1 is held during its conveying toward the other side of the paper web in the central region 21 of the guide channel 20 by means of the lateral tape parts 12, and that, for the severing of the paper web, it is pulled through the opening 22 of the guide channel 20 without being damaged as a result on account of the elasticity of the two lateral tape parts 12.

As a result, it is also avoided that the guide channel 20 is clogged by way of severed paper parts.

As a result of the winding of the tearing tape on the empty drum, over which the paper web is subsequently wound, partial deformations, namely pressure marks, are caused in the following layers of the paper web which is wound up, on account of which deformations said parts of the paper web exhibit unsatisfactory quality and therefore have to be rejected. For this reason, it is advantageous to configure the transitions from the central tape part of the tearing tape to the lateral tape parts to be as flat as possible, as a result of which markings brought about on account of deformations are then caused in only a few paper layers.

The invention claimed is:

1. A tearing tape in a papermaking installation, for severing a paper web being wound up on a drum for winding the paper web onto an empty drum, the tearing tape comprising:

a tape composed of paper and having a central tape part and two lateral tape parts in cross section;

said central tape part having a plurality of paper strings disposed to lie next to one another;

said central tape part having at least 1.5 times a thickness of said lateral tape parts; and said central tape part having a width between approximately one half a width of the tearing tape and ⅙ of the tearing tape.

2. The tearing tape according to claim 1, wherein said tape is formed of a paper tape having said central region carrying an overlay formed of said paper strings.

3. The tearing tape according to claim 2, wherein a thickness of said overlays in said central tape part decreases from a center of said tape towards said lateral regions.

4. The tearing tape according to claim 1, wherein said tape is formed of a multi-ply paper tape having said central region with an insert of said paper strings.

5. The tearing tape according to claim 4, wherein said multi-ply tape is a two-ply paper tape.

6. The tearing tape according to claim 4, wherein a thickness of said inserts in said central tape part decreases from a center of said tape towards said lateral regions.

7. The tearing tape according to claim 4, wherein said paper strings are adhesively bonded to said multi-ply paper tape.

8. The tearing tape according to claim 1, wherein said paper strings are adhesively bonded to said paper tape.

9. The tearing tape according to claim 1, wherein said central tape part has a width equal to at least ⅕, ¼, or ⅓ of the width of the tearing tape.

10. The tearing tape according to claim 1, wherein said central tape part has a width substantially equal to one half the width of the tearing tape.

11. The tearing tape according to claim 1, wherein each of said lateral tape parts has two plies formed of a folded-over paper tape, and said two plies lie flat on one another in direct contact with one another substantially without any filling material therebetween.

* * * * *